United States Patent
Farmer et al.

(10) Patent No.: US 6,473,844 B1
(45) Date of Patent: Oct. 29, 2002

(54) SYSTEM AND METHOD TO PROTECT VITAL MEMORY SPACE FROM NON-MALICIOUS WRITES IN A MULTI DOMAIN SYSTEM

(75) Inventors: James C. Farmer, Sunnyvale, CA (US); Kent A. Dickey, Westford, MA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/562,595

(22) Filed: Apr. 29, 2000

(51) Int. Cl.[7] .............................................. G06F 12/00
(52) U.S. Cl. ...................................... 711/164; 711/156
(58) Field of Search ................................ 711/163, 164, 711/156; 705/1, 57; 707/8; 365/189.01; 380/28

(56) References Cited

U.S. PATENT DOCUMENTS

| | | | | |
|---|---|---|---|---|
| 4,396,914 A | * | 8/1983 | Astom ........................ 340/5.26 |
| 4,597,061 A | * | 6/1986 | Cline et al. ............. 365/189.01 |
| 4,597,061 A | * | 6/1986 | Cline et al. ............. 365/189.01 |
| 4,604,727 A | * | 8/1986 | Shah et al. ............. 365/189.01 |
| 4,665,506 A | * | 5/1987 | Cline et al. ............. 365/189.01 |
| 4,918,728 A | * | 4/1990 | Matyas et al. ................. 380/28 |
| 5,692,178 A | * | 11/1997 | Shaughnessy ................... 707/8 |
| 6,081,785 A | * | 6/2000 | Oshima et al. ................. 705/1 |
| 6,301,569 B1 | * | 10/2001 | Oshima et al. ................ 705/57 |

* cited by examiner

*Primary Examiner*—David Hudspeth
*Assistant Examiner*—Fred F. Tzeng

(57) ABSTRACT

A system and method is described in which protected memory writes are achieved in single transaction without leaving open a window in time for erroneous data to corrupt space in a target register. A single data packet preferably includes both user data to be written to a target storage device or location as well as the key data for authorizing the writing of such user data. Key data is preferably calculated by manipulating user data contained in the same packet or transmission thereby simplifying a verification process conducted the controller associated with target storage location.

13 Claims, 2 Drawing Sheets

SYSTEM AND METHOD TO PROTECT VITAL MEMORY SPACE FROM NON-MALICIOUS WRITES IN A MULTI DOMAIN SYSTEM

TECHNICAL FIELD

The invention relates in general to data storage access and in particular to data storage access authorization.

BACKGROUND

In multi-processor, multi-entity data processing environments, a number of different devices may transmit data to a number of different possible destinations. In this environment, it is possible for a malfunctioning processor or other device to send erroneous data to a number of possible destinations including sensitive data storage areas, such as random access memory and registers. In order to avoid corruption of data in such data storage devices, a mechanism for controlling access to data devices has been implemented in the prior art.

A common prior art approach to restricting unauthorized access to a storage device involves employing one register for verification of a key value associated with proper authorization to transfer data and a separate register or other storage device for storage of the actual transmitted data, if a transfer is authorized. The key value is generally a stored value which should be matched by an incoming write request in order for the target register or target data storage device to be made accessible or unlocked.

FIG. 1 depicts a flowchart 100 for authorization to write to a selected data storage location according a prior art solution. The program generally begins at the start block 101. At step 102, the prior art method generally transmits a message to a key register to unlock a target register. At step 103 the program generally determines whether a response from the key register indicates that authorization to write to the target register has been granted. If such authorization has not been granted, the program generally polls the key register until a response is issued.

If a response granting write authorization is received, data is generally written to the target register in step 104. Afterward, the program awaits a response indicating that the write of data to the target register has been successfully completed. When a response arrives indicating successful execution of the write to the target register, the program generally writes data to the key register to again lock the target register in step 105. In step 107, the program then awaits an indication that the key register has been re-locked. It will be appreciated that during a "window of vulnerability" in between steps 102 and 106, assuming both steps are successful at their respective tasks, the target register may be written to not only by an intended source but is also vulnerable to being written to by any device in the surrounding computing system, thereby presenting the possibility of data corruption in the target register during the identified window of opportunity. Generally, upon receiving an indication that the key register has been successfully re-locked, the program concludes at step 108. The above approach presents certain shortcomings which are outlined below.

It is a problem in the art that three separate transactions are generally conducted in order to temporarily grant access to a usually locked target register.

It is a further problem in the art that there is a period of time (window) between unlocking and re-locking the target register by the key register and during this window, erroneous information could potentially be written to the target register.

SUMMARY OF THE INVENTION

These and other objects, features and technical advantages are achieved by a system and method which incorporates user data to be written to a storage device and key data for establishing authority to write to the storage device into a single data transmission to a single target storage device. This approach preferably enables a protected write operation to be conducted in a single transaction without leaving open a window of opportunity for an erroneous data transmission to corrupt data storage in the target storage device.

In a preferred embodiment, a communication path to the target data storage device, which may be a register, memory location or other storage mechanism, is 64 bits wide, although communication paths of any width could be employed. The communication path preferably includes both user data and key data. Herein, "user data" generally refers to data which the inventive mechanism seeks to store in a target storage device, "key data" generally refers to data employed to establish authorization to store the data in the pertinent storage device, and "packet" or "data packet" generally refers to a combination of the user data and key data. The number of bits dedicated to each of user data and key data is variable. For example, where the communication path to the target register is 64 bits wide, 32 bits could be dedicated to user data and 32 bits to key data. Alternative distributions of bits between user data and key data may be employed and all such variations are included within the scope of the present invention.

In a preferred embodiment, a single storage device and associated controller perform the functions of receiving and storing the user data (if authorized) and establishes authorization for the storage to occur by determining whether the key data portion of the received data packet properly authorizes storage of the user data portion of the received packet. In this manner, the granting of access to the target device, the writing of user data to the target device, and the restoration of security against unauthorized writing to the target device may preferably be accomplished in single transaction. Moreover, since the user data and key data preferably arrive at the target device simultaneously, there is preferably no window of opportunity within which unauthorized data may be written to the target device.

In a preferred embodiment, an algorithm for determining the key data involves performing a boolean operation on a selection of the user data bits. Preferably, the algorithm and the user data bits upon which the algorithm is performed, is established both at the microprocessor and at one or more data storage devices which will receive the data packets containing both user data and key data. Within the various data storage devices, the algorithm for calculating key data from the user data may be fixed, or dynamically alterable in software or hardware. Where a plurality target storage devices are employed in conjunction with one or more processors, the various target storage devices may each have unique key data calculation algorithms, or alternatively, two or more target storage devices may share a common key data calculation algorithm, and all such variations are included within the scope of the present invention.

Therefore, it is an advantage of a preferred embodiment of the present invention that device access control operations and the writing of user data may be accomplished in a single write transaction.

It is a further advantage of a preferred embodiment of the present invention that the simultaneous arrival at the target device of user data and key data removes any window of opportunity within which erroneous data may overwrite data in the target storage device.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
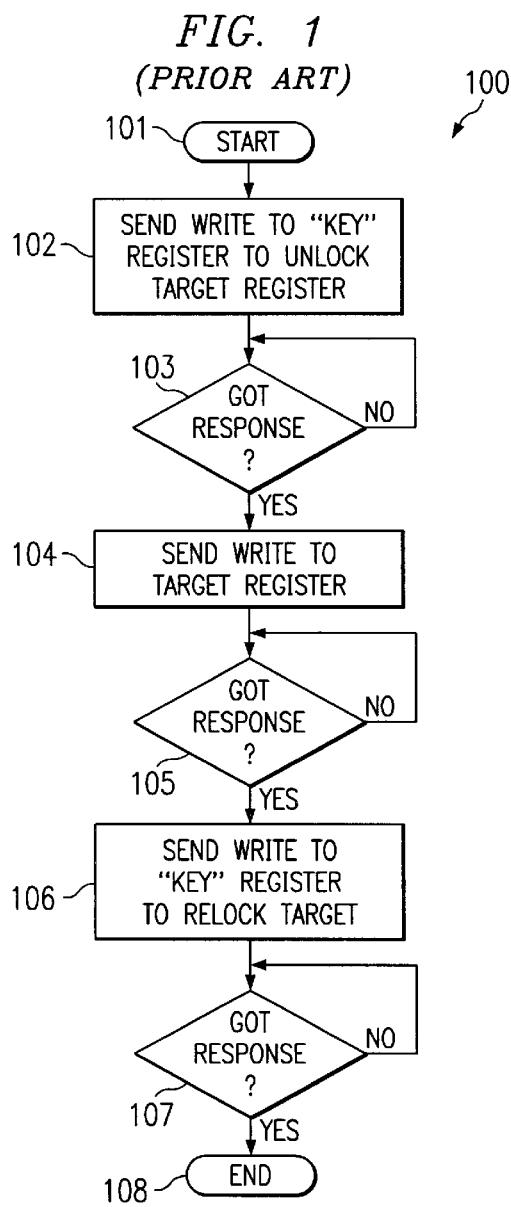
FIG. 1 depicts a flowchart for authorization to write to a selected data storage location according a prior art solution.
Figure 2:
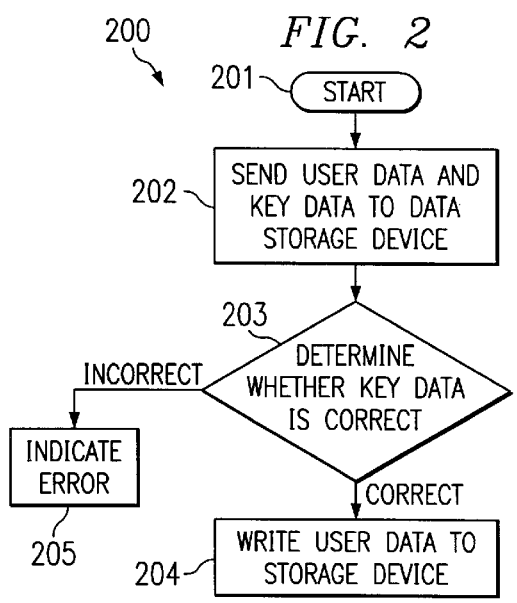
FIG. 2 depicts a flowchart for authorizing and writing data to a target storage device according to a preferred embodiment of the present invention.
Figure 3:
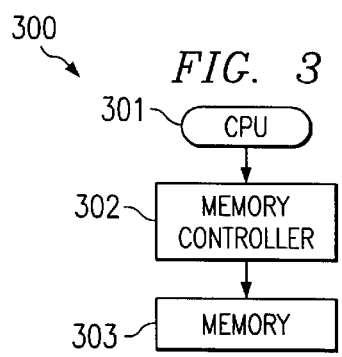
FIG. 3 depicts a selection of components suitable for use in the inventive memory protection scheme.

FIG. 2 depicts a flowchart 200 for authorizing and writing data to a target storage device according to a preferred embodiment of the present invention. FIG. 3 generally depicts a simplified arrangement of devices for implementing the inventive memory protection scheme. In FIG. 3, CPU 301 transmits data to memory controller 302 which preferably performs appropriate analysis of transmitted key data. Memory controller 302, in turn, then preferably communicates authorized data to memory 303. It will be appreciated that any storage device could be substituted for memory 303 and an appropriate controller for an alternative storage device could be inserted in place of memory controller 302, and all such variations are included in the scope of the present invention.

Figure 4:
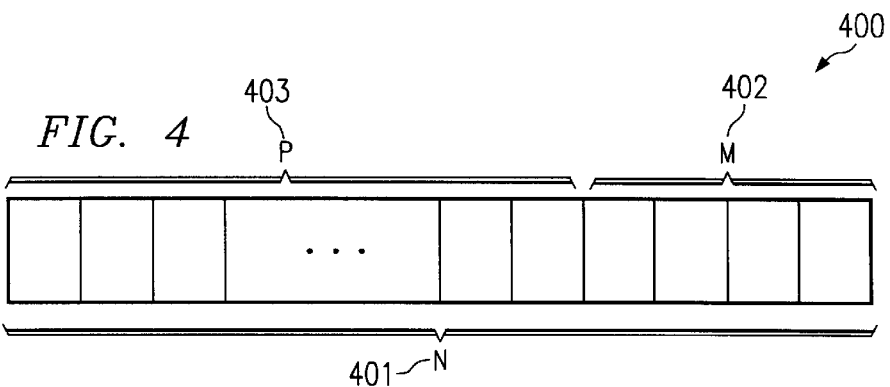
FIG. 4 depicts an exemplary data packet according to a preferred embodiment of the present invention.

FIG. 4 depicts an exemplary data packet 400 according to a preferred embodiment of the present invention. Data packet 400 preferably includes N bits 401 of which M bits 402 are preferably employed to represent key data intended to enable authorization for writing P bits 403 of user data to the data storage device. N 401 may be any number of bits and M may be any subset of N, meaning that there is generally no fixed number of bits in data packet 400 and no fixed distribution of such bits between user data and key data. Herein, key data is generally considered "correct" or "valid" only when such key data properly authorizes user data with which it is associated to be written into the storage location to which data packet 400 was transmitted.

Returning to FIG. 2, the program starts at step 201. At step 202, the method preferably transmits data to a data storage device which includes key data to be used to evaluate whether authorization will be granted. At step 203, a controller associated with the data storage device, such as memory controller 302 in FIG. 3, preferably determines whether the key data within the transmitted data is correct (valid). If the key data is correct, the user data portion of the data transmitted in step 202 is preferably written to the data storage device in step 204. If the key data is not correct, an error is preferably indicated in step 205. In addition to indicating an error, the controller associated with the data storage device may return the transmitted data to the source of the data along with an indication that the key data was incorrect.

In a preferred embodiment, all of data packet 400 (FIG. 4), and therefore user data 403 and key data 402, is transmitted simultaneously. Such simultaneous transmission preferably operates to remove any time period during which the target storage device is vulnerable to an erroneous data transmission. In an alternative embodiment, data packet 400 could be transmitted serially, in which case, although the key data and user data would arrive in close succession, their arrival at a controller for the target storage device would not be simultaneous.

In a preferred embodiment, an algorithm for determining the key is implemented at the CPU 300 and memory controller 302. The same algorithm should preferably be employed at CPU 301 as at memory controller 302 so that a properly established key is recognized as such by memory controller 302. A preferred algorithm for calculating the key data 402 is to perform a boolean operation on a selected number of user bits 403.

In an exemplary case, P 403 includes more than 6 bits, and M 402 includes three bits, the algorithm could consist of performing a logical AND operation of user data bits 1, 2, and 3 with user data bits 4, 5, and 6, respectively. With this approach, correct key data associated with a user data 403 may be determined having knowledge of the algorithm and the user data itself, thereby removing a need a separate transmission of key data to memory controller 302. Once the user data is identified at CPU 301, the key data is preferably calculated and added to the user data to form data packet 400. Upon reception at memory controller 302, the memory controller 302 preferably repeats the calculation of key data 402 based on the user data 403 and compares the key data calculated at the memory controller 302 with the key data 402 included in memory packet 400. The system response to correct and incorrect key data was described above in connection with FIG. 2 and will therefore not be repeated here. It will be appreciated that a controller for any type of data storage device could be substituted for memory controller 302 in the above discussion.

It will be appreciated that the above approach is but one way to determine an algorithm for calculating key data and that numerous others may be practiced without departing from the scope of the present invention. Other data from which key data may be calculated includes but is not limited to: system clock settings, and memory address locations to which user data is directed. Alternatively, a key may be employed which is constant and not dependent upon a data source or an algorithm.

In a preferred embodiment, algorithms employed at different storage devices in a complex computing system may either all use the same algorithm or alternatively, each storage device could employ an algorithm specific to that device. Where a plurality of different algorithms are employed, transmitting CPUs would preferably retain access to a log of the algorithms employed at the various different target storage devices. Algorithms employed at the various storage devices may be either fixed or re-programmable. In a simpler alternative approach, a key may be employed which is constant and independent of the user data.

Figure 5:
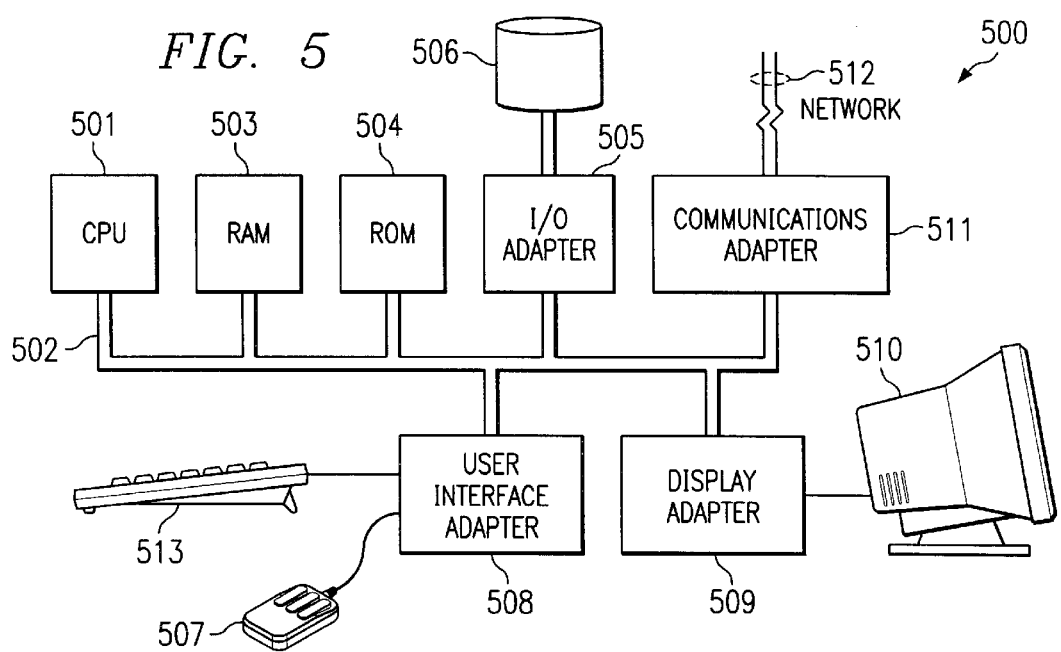
FIG. 5 depicts data processing equipment adaptable for use with a preferred embodiment of the present invention.

FIG. 5 illustrates computer system 500 adaptable for use with a preferred embodiment of the present invention. Central processing unit (CPU) 501 is coupled to system bus 502. The CPU 501 may be any general purpose CPU, such as an HP PA-8200. However, the present invention is not restricted by the architecture of CPU 501 as long as CPU 501 supports the inventive operations as described herein. Bus 502 is coupled to random access memory (RAM) 503, which may be SRAM, DRAM, or SDRAM. ROM 504 is also coupled to bus 502, which may be PROM, EPROM, or EEPROM. RAM 503 and ROM 504 hold user and system data and programs as is well known in the art.

Bus 502 is also coupled to input/output (I/O) adapter 505, communications adapter card 511, user interface adapter 508, and display adapter 509. I/O adapter 505 connects to storage devices 506, such as one or more of hard drive, CD drive, floppy disk drive, tape drive, to the computer system. Communications adapter 511 is adapted to couple the computer system 500 to a network 512, which may be one or more of local (LAN), wide-area (WAN), Ethernet or Internet network. User interface adapter 508 couples user input devices, such as keyboard 513 and pointing device 507, to the computer system 500. Display adapter 509 is driven by CPU 501 to control the display on display device 510.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for protecting memory space in a target storage device during a write operation in a computer system, the method comprising the steps of:
   composing a single data packet including user data and key data, wherein the composing step includes:
   gathering user data for transmission to said data storage device,
   calculating key data based on said gathered user data, wherein the calculating step includes performing a boolean operation on selected bits of said user data to generate said key data, and
   combining said gathered user data and said calculated key data to form said composed single data packet;
   transmitting said single data packet to a data storage device;
   determining whether said key data is valid; and
   writing said user data into said data storage device only when said key data is valid.

2. The method of claim 1 wherein the determining step comprises the step of:
   generating verification key data from said user data at a controller of said data storage device; and
   establishing said calculated key data as valid only if said generated verification key data matches said key data included in said single data packet.

3. The method of claim 2 wherein said step of generating verification data comprises the step of:
   repeating said step of calculating key data at said controller of said data storage device.

4. The method of claim 1 further comprising the step of:
   generating key data based on a destination address of said write operation.

5. The method of claim 1 further comprising the step of:
   generating key data based on a system clock setting of said computer system.

6. A system for conducting a protected memory write to a storage device in a single transaction within a computer system, the system comprising:
   means for simultaneously delivering user data and key data to a controller of said storage device; and
   means for determining whether said key data authorizes writing said user data to said storage device; and
   an algorithm at a delivering device for calculating said key data, wherein said algorithm calculates said key data from said user data and based on a clock setting of said computer system.

7. The system of claim 6 further comprising:
   means for writing said user data to said storage device only when said key data authorizes writing said user data.

8. The system of claim 6 wherein said determining means further comprises:
   means for generating verification data at said storage device controller; and
   means for comparing said verification data to said key data.

9. The system of claim 6 wherein said determining means further comprises:
   means for authorizing writing of said user data only where said verification data matches said key data.

10. A computer program product having a computer readable medium having computer program logic recorded thereon for protecting memory space in a target storage device during a write operation in a computer system, the computer program product comprising:
    code for composing a single data packet including user data and key data, wherein the code for composing includes:
    code for gathering user data for transmission to said data storage device;
    code for calculating key data based on said gathered user data, wherein the code for calculating includes code for performing a boolean operation on selected bits of said user data to generate said key data; and code for combining said gathered user data and said calculated key data to form said composed single data packet;

code for transmitting said single data packet to a data storage device; and code for determining whether said key data is valid.

11. The computer program product of claim 10 further comprising:

code for writing said user data into said data storage device only when said key data is valid.

12. The computer program product of claim 10 wherein the code for determining comprises:

code for generating verification key data from said user data at a controller of said data storage device; and code for establishing said calculated key data as valid only if said generated verification key data matches said key data included in said single data packet.

13. The computer program product of claim 12 wherein said the code for generating verification data comprises:

code for repeating said step of calculating key data at said controller of said data storage device.

* * * * *